United States Patent [19]

Yoshida et al.

[11] Patent Number: 5,199,274

[45] Date of Patent: Apr. 6, 1993

[54] AUTOMOTIVE AIR CONDITIONING APPARATUS

[75] Inventors: Makoto Yoshida, Kusatsu; Sugimatsu Hasegawa, Otsu; Masafumi Nishimiya, Kusatsu, all of Japan

[73] Assignee: Matsushita Electric Industrial Co., Ltd., Osaka, Japan

[21] Appl. No.: 900,937

[22] Filed: Jun. 17, 1992

[30] Foreign Application Priority Data

Jun. 17, 1991 [JP] Japan ................................. 3-144464
Apr. 1, 1992 [JP] Japan ................................. 4-079448

[51] Int. Cl.$^5$ ......................... F25B 27/00; B60H 1/32
[52] U.S. Cl. ................................... 62/228.4; 62/230; 62/323.3; 62/243
[58] Field of Search ................. 62/228.1, 228.4, 243, 62/230, 228.5, 323.4, 323.3, 323.1; 322/28

[56] References Cited

U.S. PATENT DOCUMENTS

| 4,735,058 | 4/1988 | Umezu et al. ............... 62/230 X |
| 4,736,595 | 4/1988 | Kato ........................... 62/228.4 X |
| 4,870,833 | 10/1989 | Matsuda et al. ............ 62/228.4 X |
| 5,107,685 | 4/1992 | Kobayashi .................. 62/230 X |

Primary Examiner—Harry B. Tanner
Attorney, Agent, or Firm—Wenderoth, Lind & Ponack

[57] ABSTRACT

A rapid voltage drop due to generator output saturation is prevented by providing a generator output saturation detection means that extracts a generator output saturation detection signal from the collector terminal of the field transistor controlling the excitation current of the automotive generator and measures the duty ratio of the field transistor in the control device to detect saturation of the generator output, and a compressor control means for reducing the speed of the electrical compressor when saturation is detected.

1 Claim, 6 Drawing Sheets

AUTOMOTIVE AIR CONDITIONING APPARATUS

BACKGROUND OF THE INVENTION

The present invention relates an automotive air conditioning apparatus with an electrical compressor used for air conditioning.

Recent automotive air conditioning systems use an electrical compressor which is controlled to provide air conditioning inside the vehicle with no relationship to the engine speed. An automotive air conditioning system of this type as described in Japanese patent S63-57316 is described below with reference to FIGS. 1 and 2.

This system is installed in a bus 21 with a rear-mounted drive engine 22. A generator 23 is connected to the drive shaft of the engine 22 by means of an electromagnetic clutch 24. The air conditioning unit 25 comprises the components required by the cooling cycle. The electrical power needed by the air conditioning unit 25 is provided by the generator 23 and conducted over electrical lines 26.

Conditioned air from the air conditioning unit 25 is supplied to the bus interior through ducts 27 mounted on the ceiling of the bus 21. The air conditioning unit 25 comprises an inverter 28 which receives the electricity produced by the generator 23. The compressor 29 produces the cooling cycle, and features a sealed structure with a built-in sealed drive motor.

The other components of the air conditioning unit 25 include the external air heat exchanger 30, internal air heat exchanger 31, a cooling fan 32 and 33 for each of the heat exchangers, respectively, and an expansion means 34 provided in the cooling cycle between the external air heat exchanger 30 and internal air heat exchanger 31. The compressor 29 and fans 32 and 33 are driven by the electricity produced by the generator 23 and frequency adjusted by the inverter 28.

The control panel 35 that controls the inverter 28 and the electromagnetic clutch 24 is connected to these components by electrical wires 36 and 37.

The driver can thus operate the control panel 35 to control the air conditioning system whenever the engine 22 is running, and the control commands from the control panel 35 are relayed over electrical wires 36 and 37 to operate the electromagnetic clutch 24 and inverter 28.

When the electromagnetic clutch 24 is engaged, the generator 23 is driven by the engine 22 to produce electricity. Because the electrical power frequency changes with the engine 22 speed, the electrical power produced by the generator 23 is supplied to the inverter 28 to be converted to the appropriate frequency.

This frequency adjusted electrical power is then used to drive the compressor 29 and fans 32 and 33. The coolant is thus circulated by the compressor 29 through the external air heat exchanger 30, expansion means 34, and internal air heat exchanger 31, and the bus interior is air conditioned by the operation of the internal air heat exchanger 31.

As thus described, there are existing systems which have an integral generator to drive a compressor, and control the compressor speed independently of the engine speed to air condition the interior of the vehicle.

In addition, when the temperature inside the vehicle is high, the compressor is operated at a higher speed, and when the temperature inside the vehicle drops, the compressor speed is again lowered.

Unfortunately, however, the generating capacity of the generator supplying the electrical power needed to drive the compressor is dependent upon the engine speed. The air conditioning system controlled as described in Japanese patent S63-57316 therefore requires a physically large generator to assure sufficient generating capacity when the engine speed is low, and this limitation restricts the practical applicability of this air conditioning system. In addition, when the generator in this system is used to provide electrical power for both the air conditioning system and other electrical equipment, the generator output becomes saturated and the output voltage drops sharply, resulting in an adverse affect on the connected electrical equipment, when the heat load inside the vehicle is high, the electrical consumption of the other equipment is high, and the total electrical consumption exceeds the output capacity of the generator.

SUMMARY OF THE INVENTION

Therefore, an object of the present invention is to provide an automotive air conditioning apparatus comprising a generator output saturation detection means for measuring the duty ratio of a switching element to detect saturation of the generator output, and a compressor control means for lowering the operating speed of the electrical compressor when the generator output saturation detection means detects that the duty ratio of the switching element exceeds a predetermined threshold value.

By means of this construction, saturation of the generator output can be quickly detected and the compressor speed dropped, thus achieving an automotive air conditioning apparatus which is practical and yet prevents a sudden voltage drop, and the resulting adverse effects to other equipment connected to the generator, due to saturation of the generator output.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiment of a automotive air conditioning apparatus according to the present invention is described hereinbelow with reference to the accompanying figures.

Figure 1:
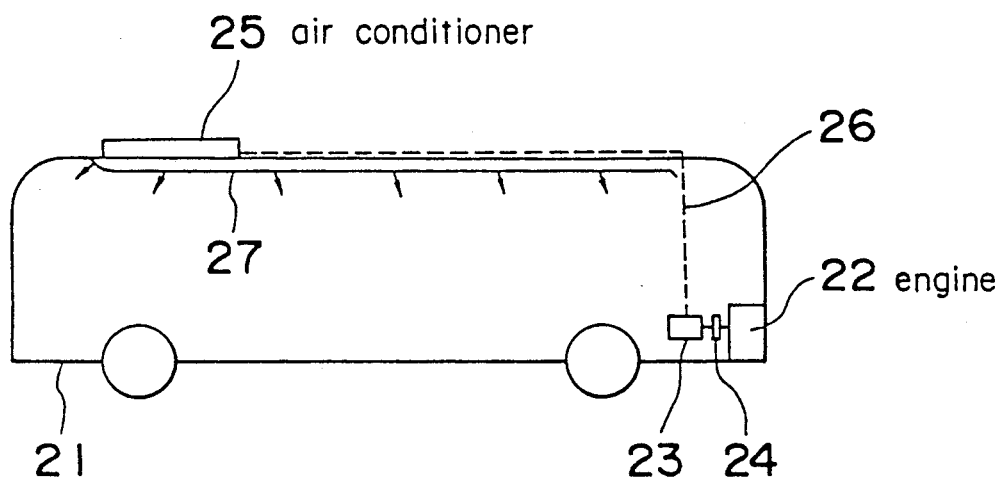
FIG. 1 is a diagram of a bus equipped with a conventional automotive air conditioning system.
Figure 2:
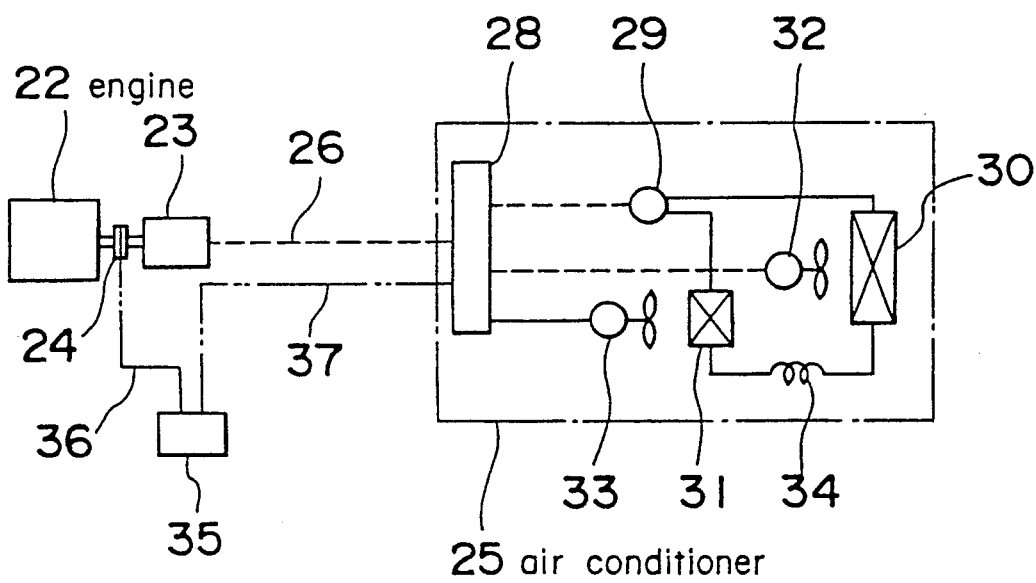
FIG. 2 is a block diagram of the conventional automotive air conditioning system.
Figure 3:
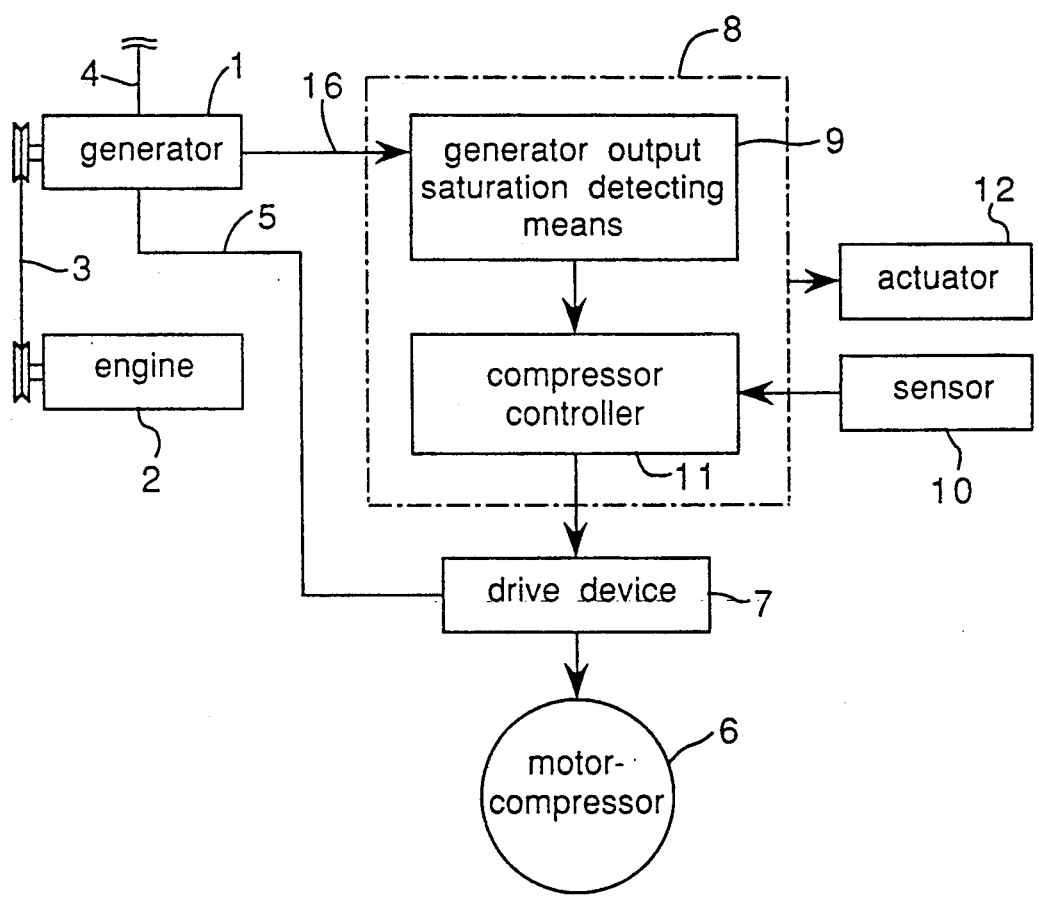
FIG. 3 is a block diagram of the preferred embodiment of an automotive air conditioning apparatus according to the present invention.

As shown in FIG. 3, a block diagram of an automotive air conditioning apparatus according to the present invention, the generator 1 is driven by the engine 2 via a belt 3 to produce electrical energy, which is output as a first output 4 and a second output 5. The second output 5 is used to drive the electrical compressor 6 and is supplied to the drive device 7, and the first output 4 is connected to the other electrical equipment. The control means 8 comprises the generator output saturation detection mean 9 for detecting saturation of the generator output, and the compressor control means 11 for controlling the compressor speed based on the signals from the sensors 10. The control means 8 also controls the various actuators 12 for the air conditioning system based on the signals from the sensors 10.

Figure 4:
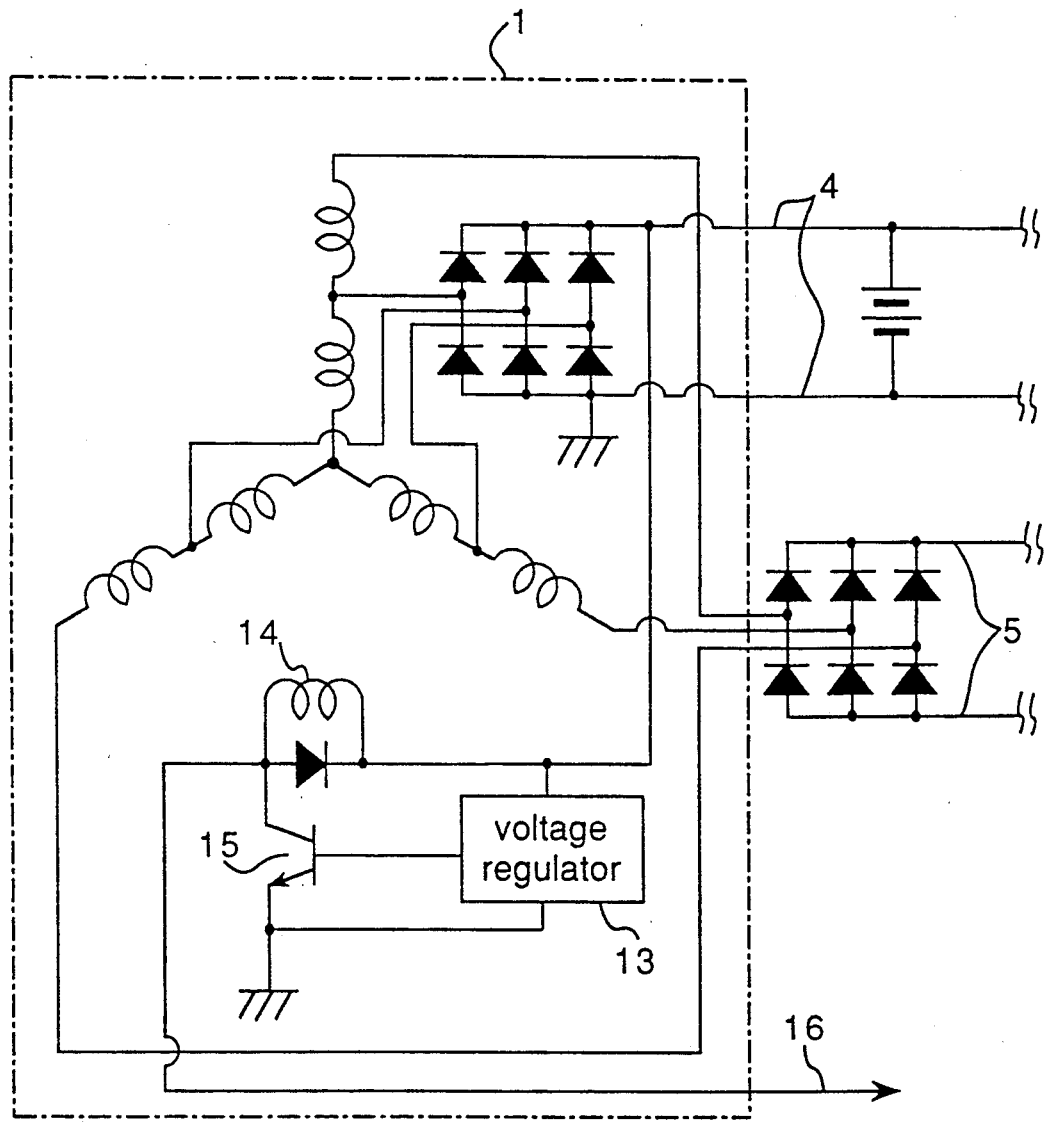
FIG. 4 is a circuit diagram of the electrical generator and peripheral connections.

FIG. 4 is a schematic diagram of the electrical circuits of the generator 1 and peripheral connections. The electrical regulator 13 feeds back the voltage of the first output 4 to control the excitation current flowing to the field coil 14 by changing the on/off state of the excitation current control field transistor 15 so that the voltage of the first output 4 remains constant. A generator output saturation detection signal 16 is obtained from the collector terminal of the field transistor 15 to measure the field transistor 15 duty ratio. The generator output saturation detection signal 16 is then input to the generator output saturation detection means 9 shown in FIG. 3.

Figure 5:
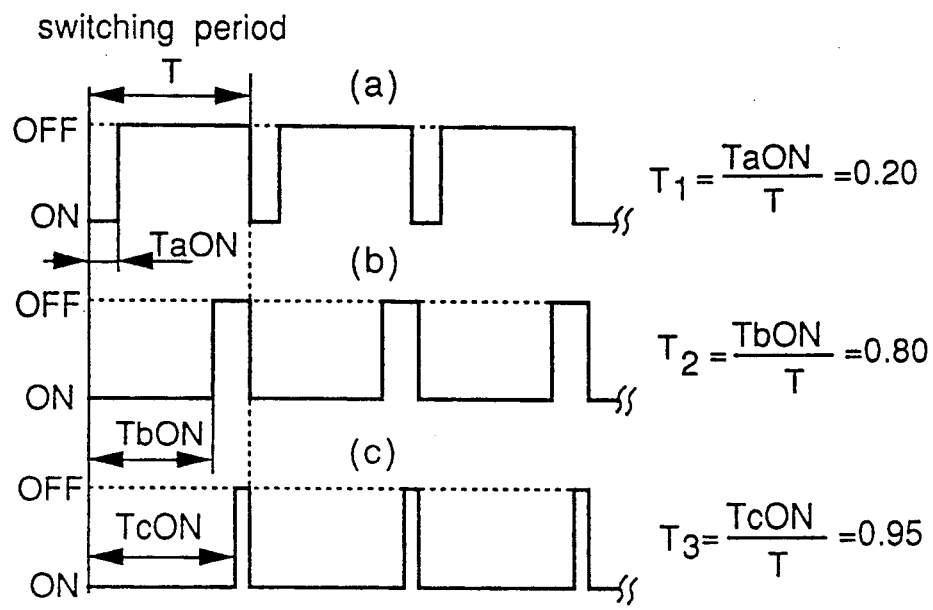
FIG. 5 is a voltage waveform diagram for the generator saturation detection signal.
Figure 6:
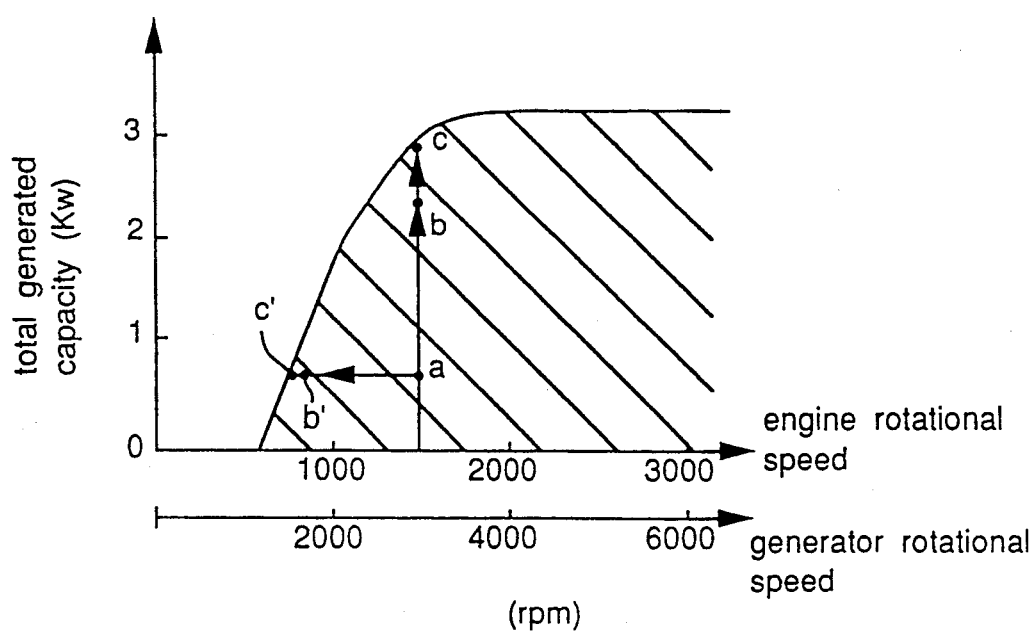
FIG. 6 is an output characteristics graph of a common generator capacity relative to engine speed an generator speed.

FIG. 5 is a waveform diagram of the generator output saturation detection signal 16 voltage. As shown in FIG. 6, the generating capacity of the generator 1 is generally dependent upon the engine speed. The allowable electrical load is indicated by the shaded area in FIG. 6, and there is a rapid drop in the output voltage of the generator 1 if this range is exceeded even slightly. It is therefore necessary to maintain the total electrical load within this range or the electrical equipment connected to the generator 1 may be damaged.

The operation of the present invention resolving this problem is described below. Referring to FIG. 6, when the engine speed is 1500 rpm and the electrical load is 600 W as indicated at point (a), the duty ratio of the field transistor 15 is T1 as shown by the waveform of the generator output saturation detection signal 16 in FIG. 5 (a). When the electrical load increases from this point to point (b) or (c) in FIG. 6, the duty ratio of the field transistor 15 increases to T2 and T3 as shown by the waveforms of the generator output saturation detection signal 16 in FIG. 5 (b) and (c), respectively. In addition, when the engine speed drops from point (a) in FIG. 6 to points (b') or (c'), the duty ratio of the field transistor 15 again increases as shown in FIG. 5 (b) and (c).

Figure 7:
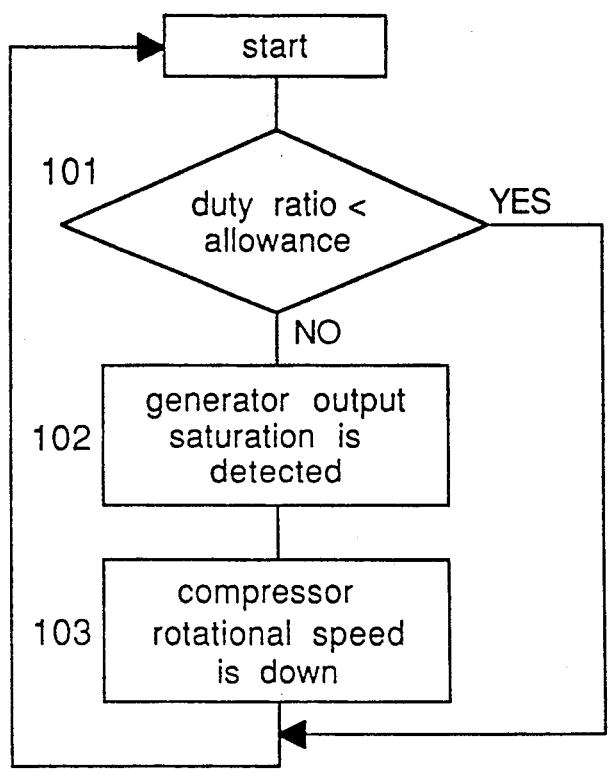
FIG. 7 is a flow chart of the control flow of the automotive air conditioning apparatus according to the preferred embodiment of the present invention.

Therefore, a sharp drop in the voltage caused by generator output saturation can be prevented with the procedure shown in FIG. 7. By measuring the duty ratio of the field transistor 15 and comparing it with a threshold value (step 101), saturation of the generator output can be determined when the duty ratio exceeds the threshold value (step 102), and the speed of the electrical compressor 6 can be reduced (step 103) to prevent saturation.

An alternative embodiment of the invention is described below. Further description with reference to FIGS. 3, 4, and 5 is omitted because of the similarities to the first embodiment described above.

Figure 8:
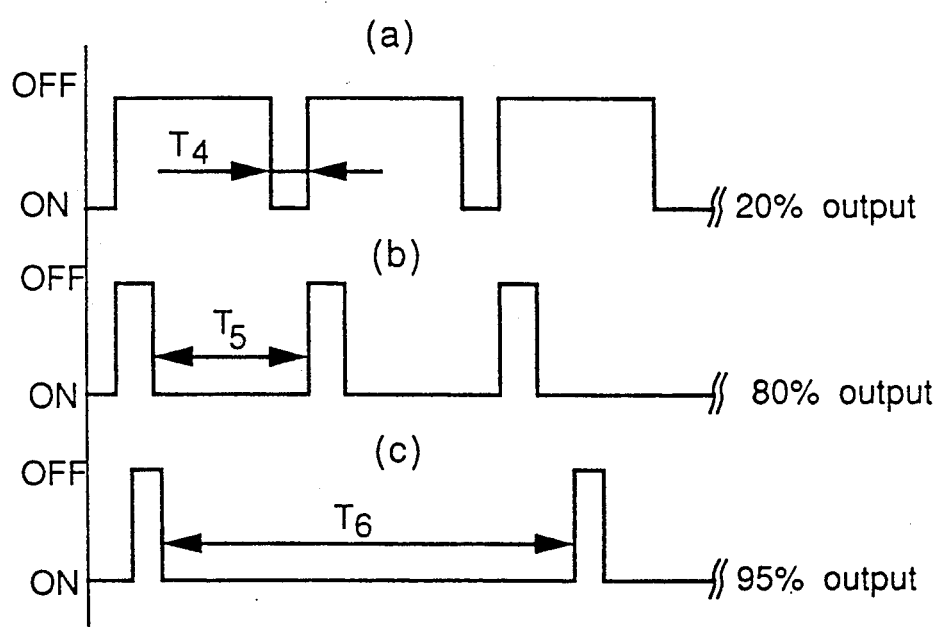
FIG. 8 is a voltage waveform diagram for the generator saturation detection signal in an alternative embodiment of an automotive air conditioning apparatus according to the present invention.

FIG. 8 is a waveform diagram of the generator output saturation detection signal 16 voltage in the control means of an automotive air conditioning apparatus according to an alternative embodiment of the invention.

Again referring to FIG. 6, when the engine speed is 1500 rpm and the electrical load is 600 W as indicated at point (a), the ON time of the field transistor 15 is T4 as shown by the waveform of the generator output saturation detection signal 16 in FIG. 8 (a). When the electrical load increases from this point to point (b) or (c) in FIG. 6, the ON time of the field transistor 15 increases to T5 and T6 as shown by the waveforms of the generator output saturation detection signal 16 in FIG. 8 (b) and (c), respectively. In addition, when the engine speed drops from point (a) in FIG. 6 to points (b') or (c'), the ON time of the field transistor 15 again increases as shown in FIG. 8 (b) and (c).

Figure 9:
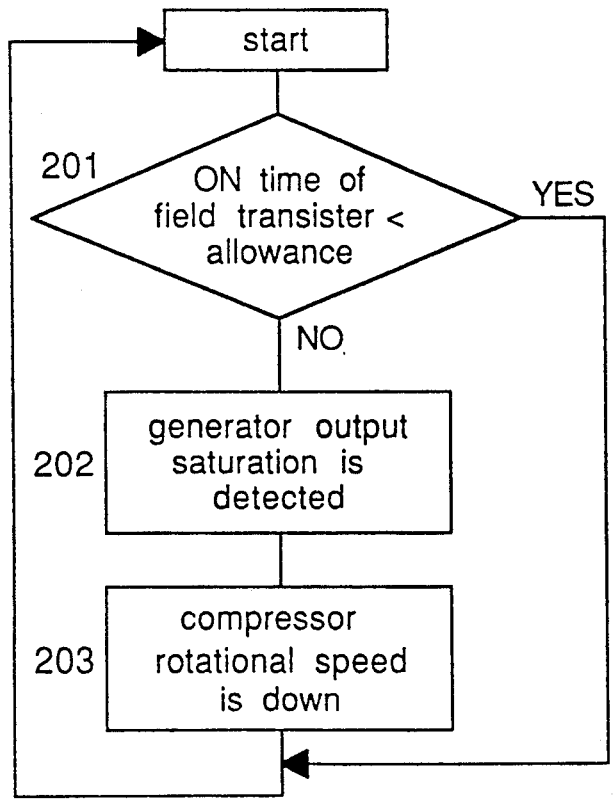
FIG. 9 is a flow chart of the control flow in the alternative embodiment.

Therefore, a sharp drop in the voltage caused by generator output saturation can be prevented with the procedure shown in FIG. 9. By measuring the ON time of the field transistor 15 and comparing it with a threshold value (step 201), saturation of the generator output can be determined when the ON time exceeds the threshold value (step 202), and the speed of the electrical compressor 6 can be reduced (step 203) to prevent saturation.

An automotive air conditioning apparatus that is practical and yet prevents a sudden voltage drop, and the resulting adverse effects to other equipment connected to the generator, due to saturation of the generator output can thus be achieved by means of an automotive air conditioning apparatus comprising an automotive generator, an electrical compressor with a built-in motor driven by the electrical input, a control means for controlling the speed of the electrical compressor according to the conditions inside and outside the vehicle, and a drive device for driving the electrical compressor according to a control signal from the control means according to the present invention. The invention is characterized by the automotive generator being driven by the engine output, having one or plural outputs, a switching element controlling the field coil and the excitation current flowing through the field coil, and a voltage regulator for maintaining a constant voltage in at least one generator output by controlling the ON/OFF state of the switching element, and the control means comprising a compressor control means for reducing the compressor speed when the generator output saturation detection means measures the ON time or switching period of the switching element and detects saturation of the generator output, and the ON time or switching period of the switching element detected by the generator output saturation detection means exceeds a predetermined threshold value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automotive air conditioning apparatus comprising an automotive generator that is driven by the engine output and comprises
   one or plural outputs,
   a switching element controlling the field coil and the excitation current flowing through the field coil, and
   a voltage regulator for maintaining a constant voltage in at least one generator output by controlling the ON/OFF state of the switching element,
   an electrical compressor with a built-in motor driven by the electrical input,
   a control means for controlling the speed of the electrical compressor according to the conditions inside and outside the vehicle, and
   a drive device for driving the electrical compressor according to a control signal from the control means,
   wherein the control means comprises a compressor control means for reducing the compressor speed when the generator output saturation detection means measures the ON time or switching period of the switching element and detects saturation of the generator output, and the ON time or switching period of the switching element detected by the generator output saturation detection means exceeds a predetermined threshold value.

* * * * *